United States Patent
Da Ponte et al.

(10) Patent No.: US 9,943,100 B2
(45) Date of Patent: Apr. 17, 2018

(54) METHOD FOR PRODUCING STUFFED FOOD AND CORRESPONDING UNIT

(71) Applicant: FROMAGERIES BEL, Paris (FR)

(72) Inventors: Victor Da Ponte, Louveciennes (FR); Gerard Soudiere, Doulcon (FR); Dominique Queste, Genlis (FR)

(73) Assignee: FROMAGERIES BEL, Suresnes (FR)

( * ) Notice: Subject to any disclaimer, the term of this patent is extended or adjusted under 35 U.S.C. 154(b) by 111 days.

(21) Appl. No.: 14/422,481

(22) PCT Filed: Oct. 22, 2013

(86) PCT No.: PCT/EP2013/072048
§ 371 (c)(1),
(2) Date: Feb. 19, 2015

(87) PCT Pub. No.: WO2014/064091
PCT Pub. Date: May 1, 2014

(65) Prior Publication Data
US 2015/0216225 A1    Aug. 6, 2015

(30) Foreign Application Priority Data

Oct. 23, 2012  (FR) ...................................... 12 60085

(51) Int. Cl.
*A23P 1/08*   (2006.01)
*A23L 1/31*   (2006.01)
(Continued)

(52) U.S. Cl.
CPC ................ *A23P 1/086* (2013.01); *A21C 3/06* (2013.01); *A21C 3/10* (2013.01); *A21C 9/063* (2013.01);
(Continued)

(58) Field of Classification Search
CPC .. A21C 3/06; A21C 3/065; A21C 3/10; A21C 11/00; A21C 11/103; A21C 11/20;
(Continued)

(56) References Cited

U.S. PATENT DOCUMENTS 1,805,018 A * 5/1931 Scruggs ................... A21C 7/01
                                                          425/320
2,173,632 A * 9/1939 Peters ...................... A61C 3/06
                                                          425/335
(Continued)

FOREIGN PATENT DOCUMENTS

DE    10 2010 028326 A1   11/2011
EP     0 160 116 A1       11/1985
(Continued)

OTHER PUBLICATIONS

Ham Rollups NPL, published Dec. 7, 2011, https://cookingwithauntjuju.com/2011/12/07/appetizer-roll-ups/.*
(Continued)

*Primary Examiner* — Drew E Becker
*Assistant Examiner* — Bryan Kim
(74) *Attorney, Agent, or Firm* — Young & Thompson

(57) ABSTRACT

This method for producing stuffed food(s), each stuffed food including an outer envelope in a first food product, and an inner stuffing in a second food product, includes the following steps:
  providing a sheet of the first food product, and a roller of the second food product, and
  winding the sheet around the roller.

13 Claims, 8 Drawing Sheets

(51) Int. Cl.

| | |
|---|---|
| *A21C 9/06* | (2006.01) |
| *A21C 15/00* | (2006.01) |
| *A21C 3/06* | (2006.01) |
| *A21C 3/10* | (2006.01) |
| *A21C 11/16* | (2006.01) |
| *A21C 11/20* | (2006.01) |
| *A23P 20/20* | (2016.01) |
| *A23P 20/25* | (2016.01) |
| *A23L 13/00* | (2016.01) |

(52) U.S. Cl.
CPC ............. *A21C 11/16* (2013.01); *A21C 11/20* (2013.01); *A21C 15/007* (2013.01); *A23L 13/03* (2016.08); *A23P 20/20* (2016.08); *A23P 20/25* (2016.08); *A23V 2002/00* (2013.01)

(58) Field of Classification Search
CPC ....... A21C 9/063; A21C 15/007; A21C 11/16; A23P 20/00; A23P 20/20; A23P 10/10; A23P 20/25; A23L 13/00; A23L 13/03; B29C 53/00; B29C 53/32; B29C 53/56; B29C 53/566; B29C 53/821; B29C 53/825; B29C 53/827; B29C 53/828
USPC ....... 426/106, 129, 130, 652, 414, 512, 513, 426/514, 518, 140, 282, 284, 501; 53/461, 204, 209, 211, 216; 425/319, 425/320, 321, 328, 371, 372, 373, 391, 425/335, 322
See application file for complete search history.

(56) References Cited

U.S. PATENT DOCUMENTS

| | | | | |
|---|---|---|---|---|
| 2,631,550 | A * | 3/1953 | Rhodes | A21C 3/06 425/371 |
| 2,677,334 | A * | 5/1954 | Hansen | A21C 7/01 425/322 |
| 3,342,144 | A * | 9/1967 | Pilliner | A21C 3/00 426/497 |
| 3,704,664 | A * | 12/1972 | Fisher, Jr. | A23P 20/20 425/321 |
| 3,901,137 | A | 8/1975 | Jimenez | |
| 4,171,197 | A * | 10/1979 | Sato | A21C 15/02 425/321 |
| 4,438,145 | A * | 3/1984 | Bakker | A21C 9/063 426/297 |
| 4,555,226 | A * | 11/1985 | Benier | A21C 3/02 425/101 |
| 4,711,789 | A * | 12/1987 | Orr | A23B 7/0205 426/232 |
| 4,741,263 | A * | 5/1988 | Ueno | A21C 3/06 425/321 |
| 4,767,638 | A * | 8/1988 | Uhrovic | A21C 3/08 425/321 |
| 4,828,862 | A * | 5/1989 | Svengren | A21C 3/06 425/321 |
| 4,961,949 | A * | 10/1990 | Barnes | A21C 9/063 426/297 |
| 4,994,293 | A * | 2/1991 | Hayashi | A21C 3/06 426/501 |
| 5,538,414 | A * | 7/1996 | Kobayashi | A21C 3/06 425/321 |
| 5,832,813 | A | 11/1998 | Shimazu | |
| 6,079,970 | A * | 6/2000 | Ueno | A21C 3/06 264/318 |
| 6,165,522 | A * | 12/2000 | Lira | A21C 9/063 426/500 |
| 6,207,212 | B1 * | 3/2001 | Nanahara | A21C 3/06 425/320 |
| 6,268,002 | B1 * | 7/2001 | Michael | A23L 13/03 426/138 |
| 6,349,635 | B2 * | 2/2002 | Taguchi | A21C 3/06 425/115 |
| 6,838,105 | B2 * | 1/2005 | Finkowski | A21C 9/063 425/320 |
| 7,182,588 | B2 * | 2/2007 | Lambauer | A21C 3/04 425/101 |
| 7,910,148 | B2 * | 3/2011 | Hayashi | A21C 3/027 425/363 |
| 8,388,334 | B2 * | 3/2013 | Van Blokland | A21C 9/063 425/320 |
| 8,961,165 | B2 * | 2/2015 | Van Blokland | A21C 3/06 425/319 |
| 2003/0228388 | A1 * | 12/2003 | Hayashi | A21C 3/027 425/363 |
| 2007/0154604 | A1 * | 7/2007 | Pasch | A21C 3/02 426/496 |
| 2007/0184161 | A1 * | 8/2007 | McDonnell | A21C 3/02 426/502 |

FOREIGN PATENT DOCUMENTS

| | | |
|---|---|---|
| EP | 0 322 220 A2 | 6/1989 |
| EP | 1 726 209 A2 | 11/2006 |
| EP | 2 092 835 A1 | 8/2009 |
| JP | H01-211478 A | 8/1989 |
| JP | H11-169136 A | 6/1999 |
| WO | 01/41574 A1 | 6/2001 |
| WO | 2011/144872 A1 | 11/2011 |

OTHER PUBLICATIONS

Cream Cheese NPL, published Jul. 28, 2009, http://chefsblade.monster.com/training/articles/980-how-to-classify-cheese?print=true.*

International Search Report, dated Jan. 10, 2014, from corresponding PCT application.

* cited by examiner

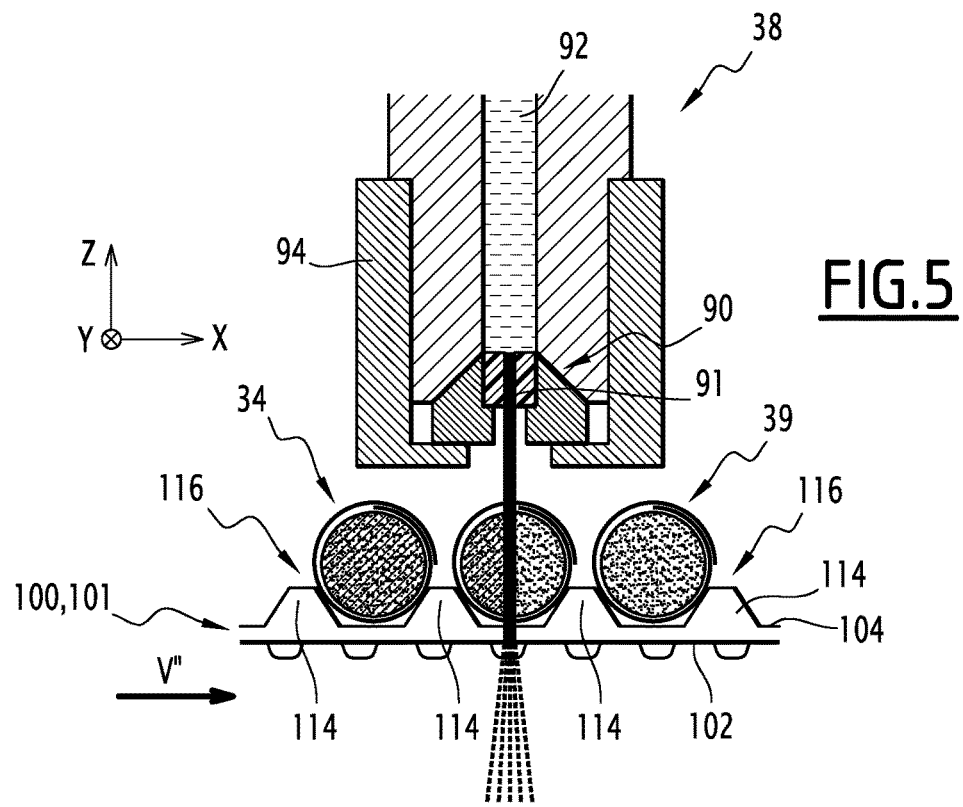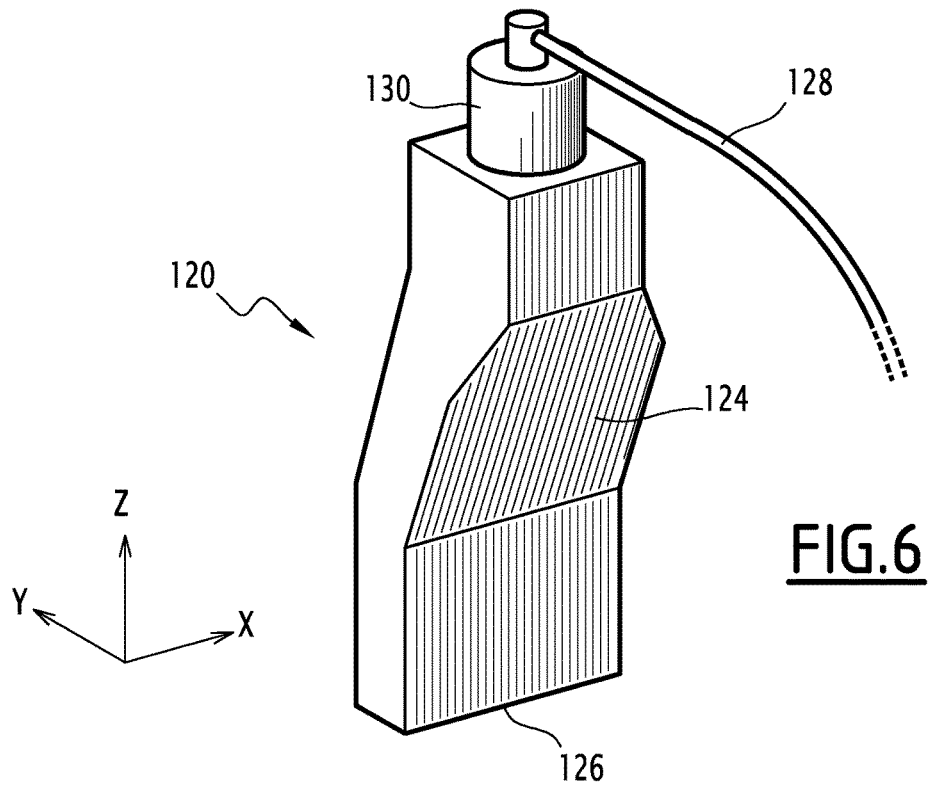

METHOD FOR PRODUCING STUFFED FOOD AND CORRESPONDING UNIT

CROSS-REFERENCE TO RELATED APPLICATION(S)

This application claims priority to International Patent Application No. PCT/EP2013/072048, filed Oct. 22, 2013, which claims foreign priority to application FR1260085, filed Oct. 23, 2012.

BACKGROUND

The present invention relates to a method for producing stuffed foods, each stuffed food comprising an outer casing made in a first food product, and an inner stuffing made from a second food product.

Methods for producing stuffed foods are known. For example, a method for producing makis is known from WO 2011/144872. In this production method, a leaf of dried algae is placed on a belt, and then rice is positioned uniformly over the sheet of algae. The belt is then wound so as to form a cylinder. This has the effect of grouping the rice in a cylinder of rice and of flattening the leaf of algae over the whole lateral surface of said rice cylinder, so as to form a maki.

However, this production method is not easily industrializable. In particular, it is not possible to produce stuffed foods on a large scale and with a high production throughput by means of this production method.

An object of the invention is to propose a method for producing stuffed foods which may easily be industrialized. Other objects are that the method allows a high production throughput and is adapted to the use of soft and/or sticky food products.

SUMMARY OF THE INVENTION

For this purpose, the object of the invention is a method of the aforementioned type, comprising the following steps:
  providing a sheet of the first food product, and a roller of the second food product, and
  winding the sheet around the roller.

In preferred embodiments of the invention, the method has also one or several of the following features, taken individually or according to all technically possible combinations:
  it comprises an additional step for cutting the roller and the sheet wound around into segments, at least one of the segments forming a stuffed food;
  the cutting step is ensured with a water jet;
  it comprises an additional step for driving the stuffed foods with respective driving belts which separate from each other;
  the roller extends along an axis and, during the winding step, the sheet of the first food product and the roller of the second food product are introduced between a first and a second belt, the first and second belts having a relative movement relatively to each other with a velocity having a component oriented perpendicularly to the axis of the roller.
  the first belt is a lower driving belt and the second belt is an upper rolling belt, which is flexible and suspended above the first belt;
  the second belt is attached to tubes distributed over the length of the second belt, each tube being mounted on a bar with a smaller diameter than the inner diameter of the tube;
  a portion of the second belt is in contact with the first belt;
  the first food product is meat, preferably ham;
  the second food product comprises cheese, in particular soft cheese.

The object of the invention is also a unit for producing a stuffed food, for applying a method as described above, comprising:
  means for providing the sheet of the first food product,
  means for providing the roller of the second food product, and
  means for winding the sheet around the roller.

In preferred embodiments of the invention, the unit also has one or several of the following features, taken individually or according to all technically possible combination(s):
  it comprises means for cutting the roller and the sheet wound around it into a plurality of segments each forming a stuffed food;
  the cutting means is a water jet cutter,
  it comprises a plurality of driving belts each specific to a stuffed food, the driving belts being divergent from each other;
  the driving means comprises a first and a second belt, said belts having a relative movement, with respect to each other;
  the first belt is a lower driving belt and the second belt is an upper rolling belt, which is flexible and suspended above the first belt.

Other features and advantages of the invention will become apparent upon reading the description which follows, only given as an example and made with reference to the appended drawings, wherein:

BRIEF DESCRIPTION OF THE DRAWINGS

FIG. 4 is a side view of a winding station of the unit of FIG. 2, FIG. 5 is a sectional view of a cutting station of the unit of FIG. 2, FIG. 6 is a perspective view of a compressed air knife of the unit of FIG. 2.

DETAILED DESCRIPTION

Figure 1:
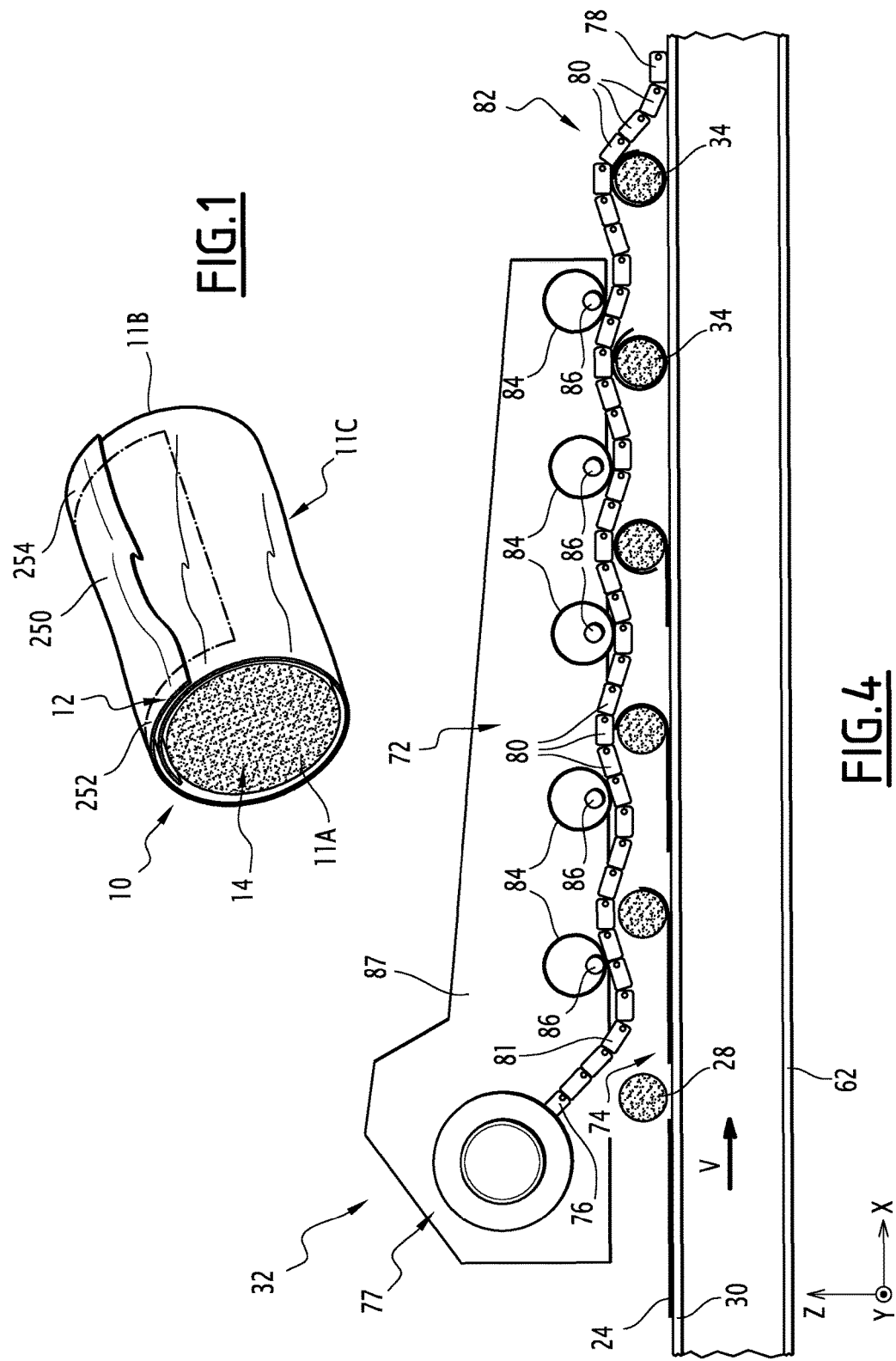
FIG. 1 is a side view of a stuffed food obtained by means of the method according to the invention.

With reference to FIG. 1, the method according to the invention is intended for producing stuffed foods such as the stuffed food 10.

This stuffed food 10 is substantially an axisymmetrical cylinder. It thus has two bases 11A, 11B each defining an axial end of the stuffed food 10, and a peripheral side face 11C connecting the bases 11A, 11B to each other. It typically has a diameter comprised between 1 and 3 cm and a length comprised between 2 and 8 cm.

The stuffed food 10 comprises an outer casing 12 in a first food product, and an inner stuffing 14 in a second food product.

The outer casing 12 is tubular. It defines the peripheral side surface 11C of the stuffed food 10. It does not cover the axial ends of the stuffed food 10. As seen from an axial end of the stuffed food 10, it forms a spiral around the inner stuffing 14.

The first food product is typically meat, and preferably ham. Alternatively, the first food product is fish, for example salmon.

The inner stuffing 14 forms a full cylinder. It is flush with the axial ends of the stuffed food 10.

The second food product is typically a cheese product comprising cheese, preferably more than 70% by weight of cheese. This cheese product in particular is formed by fat curd mixed with spices.

The second food product notably has a density comprised between 0.9 and 1.

Preferably, the second food product has a penetrometry index comprised between 80 and 300. It is advantageously a shear-thinning product having a consistency comprised between 800 and 1200 Pa·s at 12° C., with a shear-thinning index comprised between 0.10 and 0.20.

Figure 2:
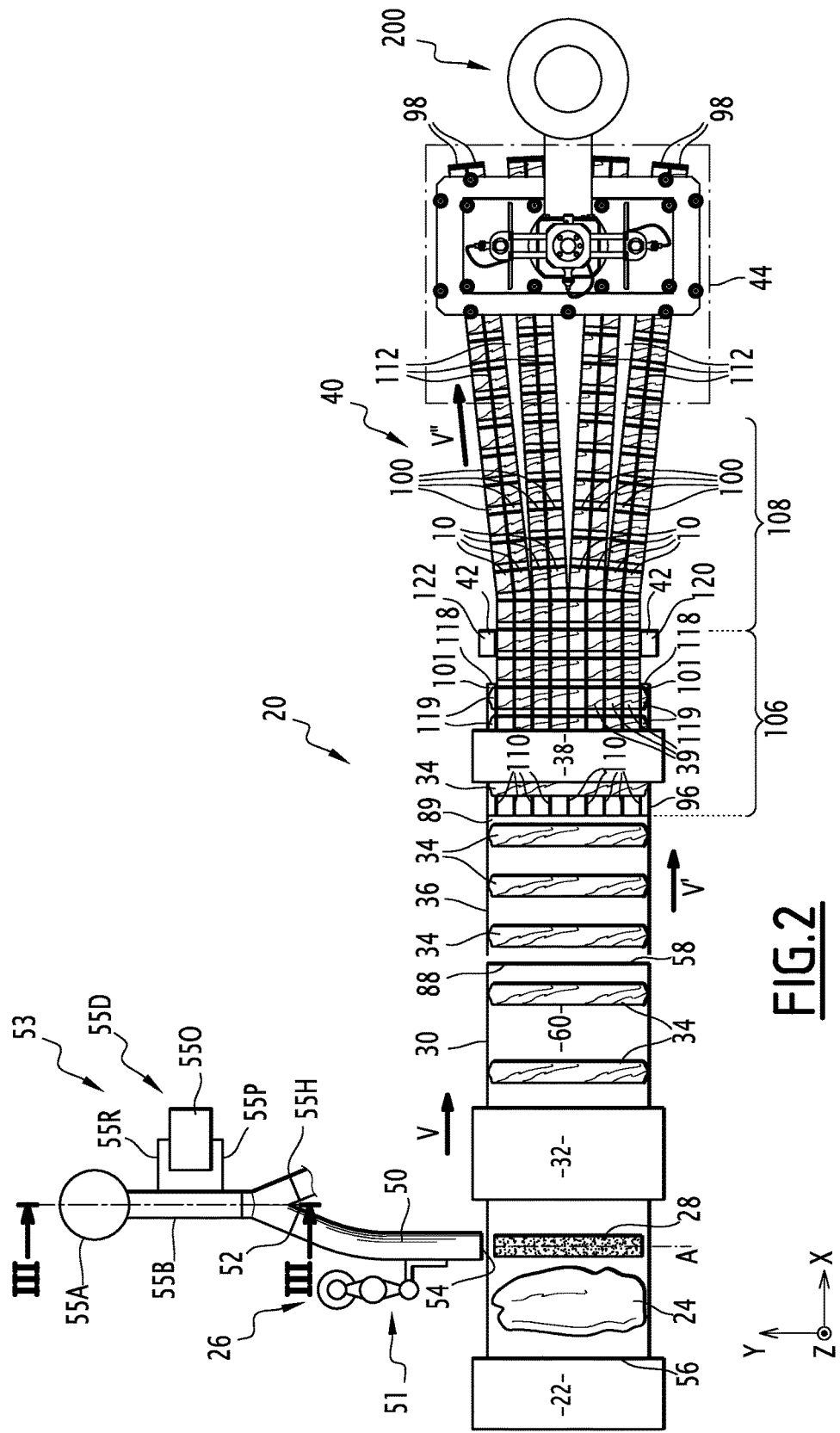
FIG. 2 is a general top view of a unit according to the invention.

The method according to the invention is for example applied by the unit 20 illustrated in FIG. 2.

As visible in this figure, the unit 20 comprises a station 22 for providing a sheet 24 of the first food product, a system 26 for providing a roller 28 of the second food product, and a belt 30 for driving the sheet 24 and the roller 28. The unit 20 also comprises a station 32 for winding the sheet 24 around the roller 28 so as to form a large roll 34, and a belt 36 for storing large rolls 34. The unit 20 finally comprises a station 38 for cutting each large roll 34 into segments 39, a device 40 for driving and separating the segments 39, a system 42 for removing the end segments 39, and a station 44 for packing the stuffed foods 10.

Subsequently, the orientation terms are meant relatively to the direct orthogonal reference system defined below, illustrated in the figures, and wherein are distinguished:
- a longitudinal axis X, oriented from the upstream side to the downstream side,
- a transverse axis Y, oriented from right to left, and
- a vertical axis Z, oriented from bottom to top.

The provision station 22 is positioned at the upstream end of the unit 20. It is typically formed with a ham slicing robot. This robot is adapted for receiving a block of ham and for automatically producing it in slices. Such robots are known and generally used in the agrifood industry.

The provision station 22 comprises an outlet 48 for depositing the sheet 24 of the first food product.

The sheet 24 is substantially rectangular. The outlet 48 is adapted so as to deposit the sheet 24 on the driving belt 30 so that the direction with the greatest dimension of the sheet 24 is oriented substantially transversely.

The roller 28 is substantially rectilinear and extends along an axis A.

The provision system 26 is adapted for depositing the roller 28 on the driving belt 30 so that the axis A is substantially oriented transversely. For this purpose, the provision system 26 comprises a flexible hose 50 for depositing the second food product on the driving belt 30, and a jointed arm 51 for maneuvering the flexible hose 50.

The flexible hose 50 comprises a distal end 52 for supplying the flexible hose 50 with the second food product. This distal end is connected to a device 53 for metering the second food product. The flexible hose 50 also comprises a proximal end 54 for exit of the second food product out of the flexible hose 50.

The jointed arm 51 is programmed in order to displace the proximal end 54 transversely. Optionally, it is also programmed for displacing the proximal end 54 longitudinally and vertically.

Figure 3:
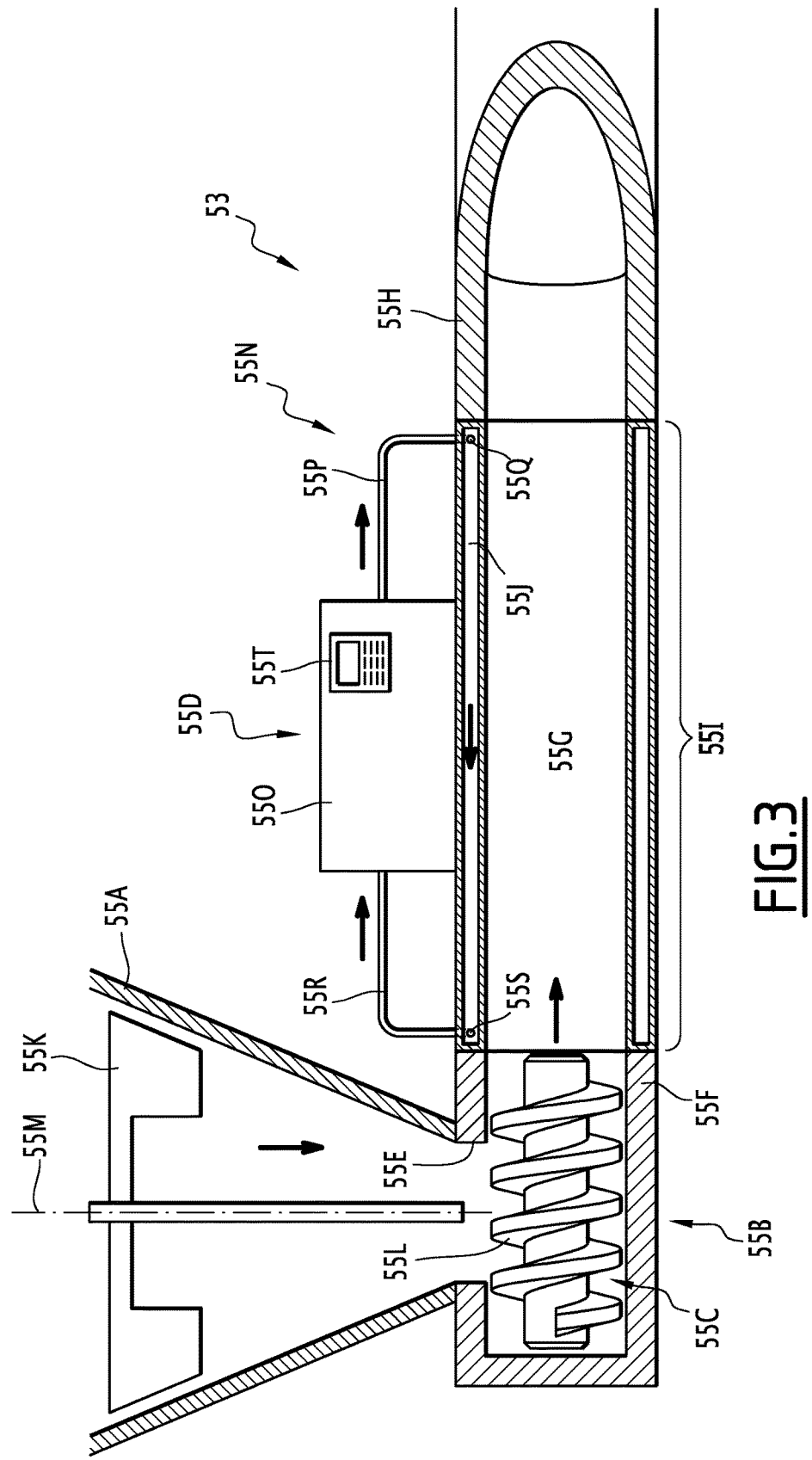
FIG. 3 is a sectional view of a metering device of the unit of FIG. 2, marked as III in FIG. 2.

The metering device 53 comprises, with reference to FIG. 3, a hopper 55A for receiving the second food product, a tube 55B for conducting the second food product from the hopper 55A to the flexible hose 50, and a system 55C for driving the second food product into the tube 55B. The metering device 53 also comprises a system 55D for cooling the second food product in the tube 55B.

The hopper 55A is positioned above the tube 55B. It has in its bottom an aperture 55E which opens into the tube 55B.

The tube 55B extends from the hopper 55A to the flexible hose 50. It comprises an outer wall 55F defining an inner space 55G for circulating the second food product. The wall 55F is in particular in stainless steel.

The tube 55B also comprises a segment 55I with a hollow wall. In this segment 55I, the wall 55F is hollow and defines a peripheral chamber 55J, extending around the inner space 55G, for circulating a fluid for cooling the second food product.

A connector 55H, positioned at one end for connecting the tube 55B to the flexible hose 50, puts the tube 55B into fluidic communication with the flexible hose 50. In the illustrated example, this connector 55H is Y-shaped, so as to also put the tube 55B in fluidic communication with another flexible hose (not shown) of a second system (not shown) for providing a second food product.

The driving system 55C comprises a stirring arm 55K and a worm screw 55L.

The stirring arm 55K is positioned in the hopper 55A. It is mounted so as to be mobile in rotation with respect to the hopper around an axis of rotation 55M coinciding with the axis of the hopper 55A. It is adapted for, upon its rotation, exerting a force on the second food product present in the hopper 55A pushing the second food product towards the aperture 55E.

The worm screw 55L is positioned in the tube 55B. Its axis of rotation coincides with the axis of the tube 55B, the worm screw 55L in particular extends below the aperture 55E.

The cooling system 55D comprises a circuit 55N for circulating a coolant fluid, and a cooling unit 55O for cooling the coolant fluid.

The coolant fluid is typically glycol water. The circuit 55N is adapted for guiding this coolant fluid of the cooling unit 55O to the chamber 55J, so that the coolant fluid circulates against the current of the second food product in the chamber 55J. For this purpose, the circuit 55N comprises:
- a first flexible hose 55P fluidically connecting the cooling unit 55O to an end 55Q of the chamber 55J close to the connector 55H,
- a second flexible hose 55R fluidically connecting the cooling unit 55O to an end 55S of the chamber 55J opposite to the connector 55H, and
- a pump (not shown), for circulating the coolant fluid in the chamber 55J from the end 55Q to the end 55S.

The cooling unit 55O is adapted for extracting heat from the cooling circuit 55N so as to bring the coolant fluid to a set temperature value comprised between −8° C. and +4° C. Preferably, it comprises, as illustrated, a control module 55T adapted for allowing an operator to change the set temperature value.

As the driving system 55C tends to warm up the second food product and degrade it, the cooling system 55D gives the possibility of compensating for this warming up and of restoring the properties of the second food product, notably in terms of viscosity. This allows a roller 28 to be obtained having a satisfactory strength.

Further, the possibility provided to the operator of changing the set temperature value allows adjustment of the cooling of the second food product in the tube 55B depending on the mechanical properties of the second food product received in the hopper 55A. It is thus possible to specifically control the strength of the roller 28, regardless of the mechanical properties of the batch of second food product used for producing the roller 28.

Returning to FIG. 2, the driving belt 30 extends from an upstream end 56 for managing the first and second food products as far as a downstream end 58 for depositing large rolls 34 on the storage belt 36.

In a known way, the driving belt 30 is an endless conveyor belt tensioned by cylinders (not shown) positioned at the upstream and downstream ends 56, 58 of the belt 30. A portion of the belt 30, positioned above the cylinders, defines an upper face 60 of the belt 30. Another portion of the belt 30, positioned under the cylinders, defines a lower face 62 (FIG. 4) of the belt 30.

One of these cylinders is driven by a motor (not shown), so as to drive the belt 30 so that each point of the upper surface 60 moves from the upstream end 56 to the downstream end 58. A velocity V of the driving belt 30 is defined as being the velocity of each of these points. The velocity V is thus substantially oriented longitudinally, from the upstream side to the downstream side.

The velocity V is in particular comprised between 100 and 200 mm/s.

The driving belt 30 crosses the winding station 32.

With reference to FIG. 4, the winding station 32 in particular comprises a first belt 70 and a second belt 72 defining between them a space 74 for introducing the sheet 24 and the roller 28.

The first belt 70 is formed by the driving belt 30.

The second belt 72 is flexible and suspended above the driving belt 30. It comprises an upstream end 76 attached to a tie 77 at a distance above the driving belt 30, and a downstream end 78 which rests on the driving belt 30.

The distance of the tie 77 to the driving belt 30 is in particular greater than the diameter of the roller 28.

The introduction space 74 is delimited between the upstream end 76 of the second belt 72, and the upper face 60 of the driving belt 30.

The second belt 72 is a meshed belt. It is formed with a plurality of meshes 80 positioned consecutively to each other from the upstream to the downstream side. Each mesh 80 is jointed with said or each mesh 80 which is adjacent to it around a substantially transverse axis. Each mesh 80 is elongated in a transverse direction. Each mesh 80 in particular is formed by a plastic profile.

The meshes 80 comprise a mesh 81 for entering into contact with the roller 28. This mesh 81 is the closest mesh to the upstream end 76, being adapted so as to come into contact with the roller 28. This mesh 81 is in particular the closest mesh to the upstream end 76, being positioned at a distance from the driving belt 30, substantially equal to the diameter of the roller 28.

The contacting mesh 81 is preferably substantially oriented parallel to the upper face 60 of the driving belt 30.

The winding station 32 also comprises a device 82 for suspending the second belt 72 above the driving belt 30. This device 82 comprises the tie 77, and a plurality of tubes 84, each freely mounted on a bar 86 with a diameter less than the inner diameter of the tube 84. By <<freely mounted on a bar 86>>, is understood that the tube 84 is positioned around the bar 86, the axis of the tube 84 being substantially parallel to the direction of greatest dimension of the bar 86, no device opposing the displacement of the tube 84 relatively to the bar 86 in a plane perpendicular to said direction of largest dimension.

Preferably, each tube 84 has a smaller length than that of the corresponding bar, and the suspension device 82 also comprises an abutment (not shown) at each end of each bar 86, for example formed by a flange, in order to maintain the corresponding tube 84 around the bar 86.

Each bar 86 is positioned at a distance from the belt 30, equal to the sum of the diameter of the large roll 34, of the thickness of the belt 72, and of the thickness of the tube 84 mounted on said bar 86. The bars 86 thereby allow the belt 72 to be maintained flattened against the large roll 34 when it is inserted between the belts 30, 72 so as to ensure proper flattening of the sheet 24 on the roller 28.

Each tube 84 is advantageously, as illustrated, substantially cylindrical.

The tubes 84 are regularly distributed between the upstream 76 and downstream 78 ends of the second belt 72.

Surprisingly it was observed that these tubes 84 gave the possibility of improving the quality of the winding of the sheet 24 around the roller 28.

Preferably, the bars 86 and the tie 77 are secured to a same frame 87 of the suspension device 82, said frame 87 having an adjustable height relatively to the driving belt 30. It is thus possible to adjust the position of the second belt 72 depending on the desired caliber for the stuffed foods.

Returning to FIG. 2, the storage belt 36 is an endless conveyor belt tensioned by cylinders (not shown) positioned at an upstream end 88 and at a downstream end 89 of the belt 36. The upstream end 88 is placed side by side at the downstream end 58 of the belt 30. Preferably it is positioned lower than said downstream end 58 of the belt 30.

A portion of the belt 36, positioned above the cylinders, defines an upper face of the belt 36. Another portion of the belt 36, positioned under the cylinders, defines a lower face (not shown) of the belt 36.

One of these cylinders is driven by a motor (not shown) so as to drive the belt 36 so that each point of the upper surface moves from the upstream end 88 to the downstream end 89. All the points of the upper surface thus move at a same velocity V' which is defined as being the velocity of the storage belt 36, and which is substantially oriented longitudinally, from the upstream side to the downstream side. The velocity V' is smaller than the velocity V.

The cutting station 38 is positioned downstream from the storage belt 36.

The cutting station 38 is a cutting station by a water jet. This gives the possibility of cutting the large roll 34 without coming into contact with the latter, which avoids deposition of the food product on a blade and is therefore hygienic. Further, this gives the possibility of having a compact cutting station 38.

In particular, as visible in FIG. 5, the cutting station 38 comprises a plurality of nozzles 90 (only one of them is illustrated in FIG. 5) for ejecting high pressurized water, preferably at more than 2,000 bars, typically at 2,200 bars. Thus, the cut is sharp and does not damage the segments 39.

Each nozzle 90 defines an orifice 91 for ejection of water. This orifice 91 has a diameter preferably greater than 0.14 mm, typically equal to 0.15 mm. Thus, the water jet is sufficiently wide so as to carry away with it a portion of the second food product, which avoids that the segments 39 adhere to each other after the cutting.

Each nozzle 90 is supplied with water by means of a conduit 92. A valve (not shown), preferably a solenoid valve, controls the supply of water to the conduit 92 for supplying each nozzle 90.

In the illustrated example, the nozzles 90 are housed in a housing 94, preferably in stainless steel. Thus, cleaning of the cutting station 38 is facilitated Returning to FIG. 2, the device 40 extends from an upstream end 96, placed side by side of the downstream end 89 of the storage belt 36, to a downstream end 98.

The device 40 comprises a plurality of driving belts 100, 101. The number of said driving belts 100, 101 is equal to the number of nozzles 90, plus one.

Each driving belt 100, 101 is an endless belt tensioned by wheels (not shown) positioned at the ends of the belt 100, 101. One of said ends delimits the first end 96.

Each belt 100, 101 comprises an inner face 102 (FIG. 5), oriented towards the wheels, and an outer face 104 (FIG. 5), opposite to the inner face 102.

A portion of the outer face 104, positioned above a line connecting the wheels associated with the belt 100, 101, defines an upper face of the belt 100, 101. Another portion of the outer face 104, positioned under said line, defines a lower face (not shown) of the belt 100, 101.

For each belt 100, 101, one of the wheels associated with said belt 100, 101 is driven by a motor (not shown), so as to drive the belt 100, 101 so that each point of the upper face moves from the upstream end 96 to the downstream end 98. All the points of the upper face thus move at a same velocity V''' which is defined as being the velocity of the belt 100, 101.

The velocity V''' is equal for each belt 100, 101. It is also equal to the velocity V'.

Each belt 100, 101 has a width, measured in the transverse direction Y, smaller than the width of each of the belts 30, 36. This width is the same for all the belts 100, 101.

The belts 100, 101 comprise central belts 100, and two end belts 101.

The end belts 101 are positioned at the transverse ends of the device 40. A first end belt 101 is positioned at the right transverse end, and a second end belt 101 is positioned at the left transverse end.

The central belts 100 are positioned transversely between the end belts 101. Together, the end belts 101 transversely surround the central belts 100.

The segments 39 borne by the end belts 101, form scraps 119. The segments 39 borne by the central belts 100 form the stuffed foods 10 produced by the unit 20.

Each central belt 100 extends from the upstream end 96 of the device 40 to the downstream end 98. Each end belt 101 is shorter than each central belt 100.

On a first portion 106 of the device 40, the belts 100, 101 extend parallel with each other. On a second portion 108 of the device 40, the belts 100 are divergent relatively to each other.

Each end belt 101 exclusively extends in the first portion 106. Thus, each end belt 101 does not have any portion away from the other belts 100, 101.

In the first portion 106, each belt 100, 101 substantially extends longitudinally. The belts 100, 101 are juxtaposed to each other, along the transverse direction Y. For each pair of consecutive belts 100, 101, a gap 110 with a constant width, i.e. for which the width does not vary between the upstream side and the downstream side of the first portion 106, is made between said belts 100, 101. This width is preferably less than one fifth of the width of each belt 100, 101.

The widths of the belts 100, 101 and of the spaces 110 are adapted so that their sum is substantially equal to the width of the storage belt 36.

In the first portion 106, the belts 100, 101 cross the cutting station 38. They are laid out relatively to the nozzles 90 so that each nozzle 90 is positioned above a space 110.

Each end belt 101 extends from the upstream end 96 as far as a terminal end 118. Said terminal end 118 is positioned downstream from the cutting station 38, and upstream from the removal system 42.

In the second portion, the belts 100 are juxtaposed to each other, along the transverse direction Y. Each belt 100 extends along an extension direction forming an angle with the extension direction of each other belt 100. For each pair of consecutive belts 100, the angle formed between the extension directions of said belts 100 is preferably less than 0°7'. In particular, for each outer pair of consecutive belts 100, i.e. for each pair of consecutive belts 100 such that one of the belts 100 of the pair is not transversely surrounded by two other belts 100, the angle formed between the extension directions of the belts 100 of the pair is preferably less than 0°55'.

It will be noted that for the sake of clarity, the angles between the extension directions of the belts 100 have been enhanced in FIG. 2.

For each pair of consecutive belts 100, a gap 112 is made between said belts 100. This gap 112 has an increasing width from the upstream side to the downstream side. It is included in the extension of a gap 110. Thus, at the limit between the first and second portions 106, 108, the width of the gap 112 is equal to the width of the corresponding gap 110.

As the stuffed foods 10 are thus borne separately from each other, they do not risk sticking together again. Further, as this operation is carried out without handling the stuffed foods 10, the latter are not damaged.

With reference to FIG. 5, each belt 100, 101 is indented. In other words, the outer face 104 of each belt 100, 101 comprises a plurality of ribs 114, each oriented perpendicularly to the extension direction of the belt 100, 101, and defining together cells 116 for receiving the large rolls 34.

The cells 116 of the different belts 100, 101 are transversely aligned relatively to each other.

This indentation gives the possibility of maintaining the large rolls 34 longitudinally separate from each other, so as to avoid their sticking together.

Returning to FIG. 2, the removable system 42 is transversely positioned on either side of the central belts 100, upstream from the second portion 108 of the device 40. It is adapted so as to detach, from the stuffed foods 10 borne by the central belts 100, the scraps 119 adhered to said stuffed foods 10.

For this purpose, the removable system 42 comprises two compressed air knives 120, 122. A first compressed air knife 120 is positioned on the right of the central belts 100, and is flush with the central belt 100 positioned on the rightmost side. A second compressed air knife 122 is positioned on the left of the central belts 100, and is flush with the central belt 100 positioned on the leftmost side. By resorting to the air knives 120, 122, it is possible to remove the scraps 119 without any contact of the removable system 42 with the food products, which avoids fouling of the removable system 42 and accordingly simplifies the cleaning of the unit 20.

With reference to FIG. 6, on which only the first compressed air knife 120 is illustrated, each compressed air knife 120, 122 comprises a body 124 comprising an internal chamber (not shown) for receiving compressed air, and opening towards the outside of the body 124 through an oblong orifice 126 oriented downwards. It also comprises a pipe 128 for supplying the chamber with compressed air, and a solenoid valve 130, positioned between the pipe 128 and the chamber, in order to control the supply of the chamber with compressed air. The solenoid valve 130 is programmed so as to fluidically connect the chamber to the pipe 128 at regular time intervals.

The compressed air knife, 120, 122 respectively, is positioned so that the oblong orifice 126 is elongated parallel to the extension direction of the central belts 100, and is flush with the rightmost central belt 100, the leftmost one respectively.

The packing station 44 is positioned at the downstream end of the instillation 20. It comprises a device 200 according to the invention for grasping the stuffed foods 10 on the central belts 100, and for depositing said foods in trays (not shown).

Figure 7:
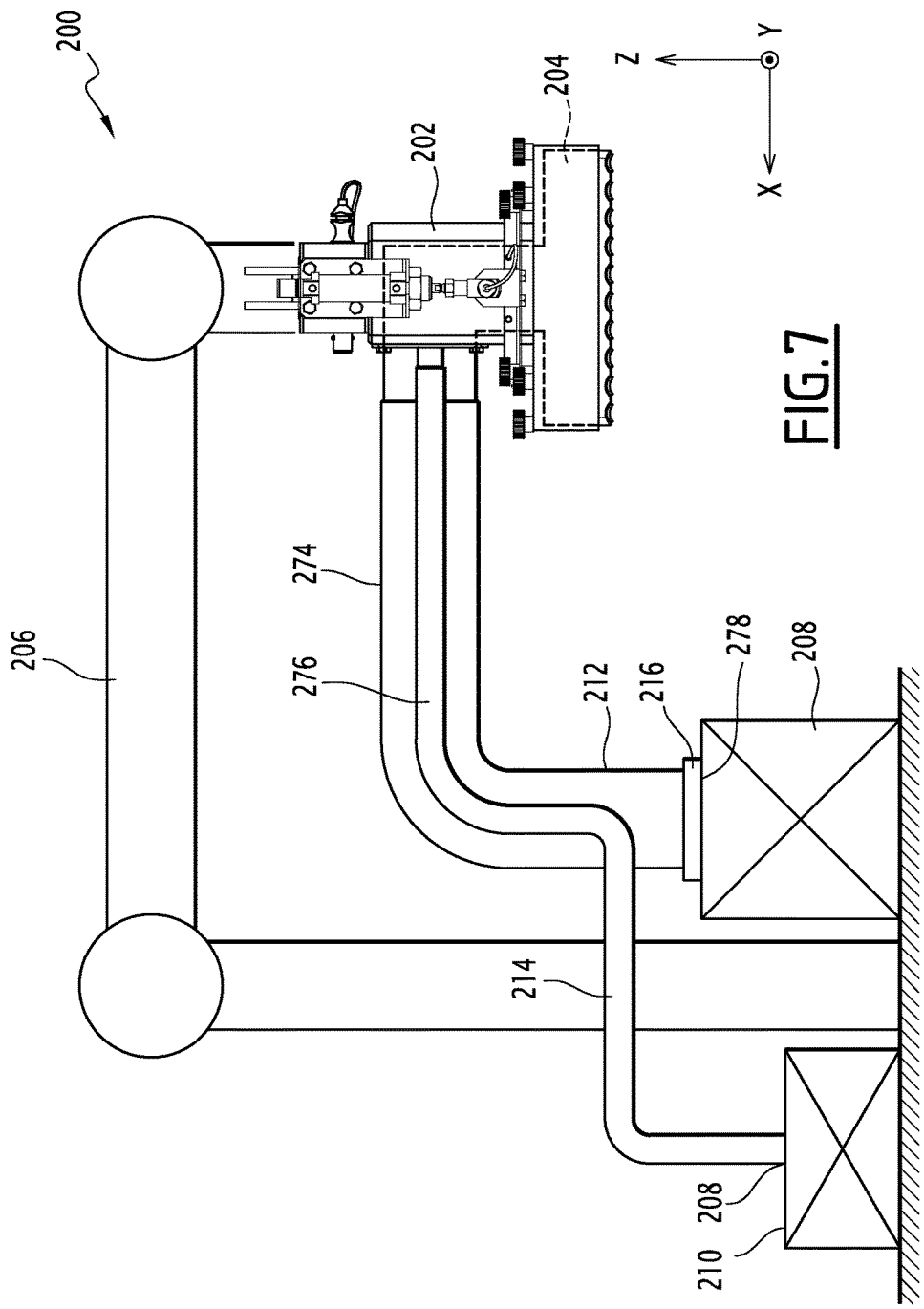
FIG. 7 is an elevational view of a grasping device of the unit of FIG. 2.

With reference to FIG. 7, the grasping device 200 comprises a grasping head 202, delimiting an internal chamber 204, and an automated arm 206 for displacing the grasping head 202. It also comprises a system 208 for depressurizing the chamber 204, a system 210 for blowing gas into the chamber 204, a first fluidic connection 212 connecting the depressurization system 208 to the chamber 204, and a second fluidic connection 214 connecting the blowing system 210 to the chamber 204. Finally, the device 200 comprises a valve 216, for selectively obturating or releasing the first fluidic connection 212.

Figure 8:
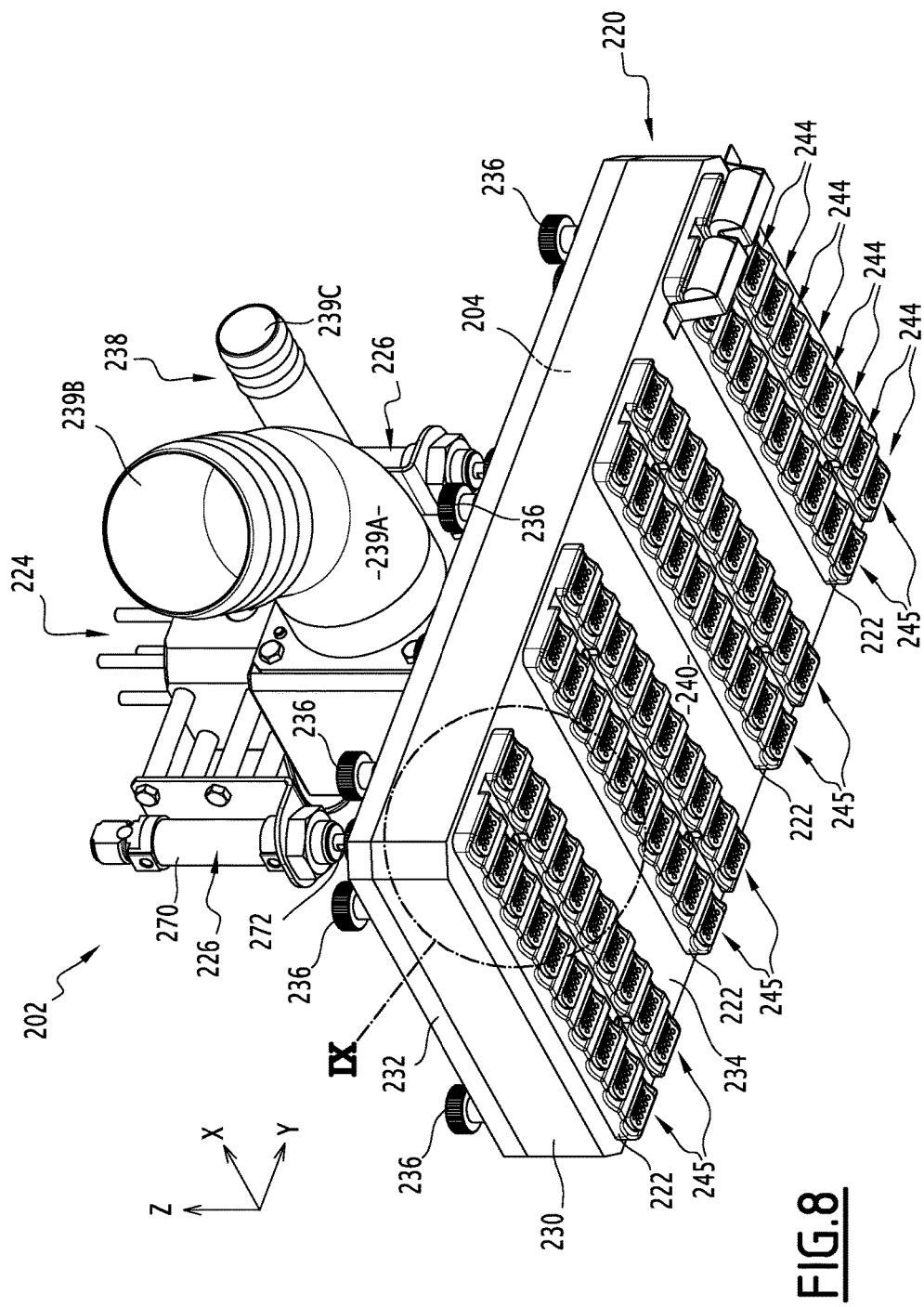
FIG. 8 is a perspective top view of a grasping head of the grasping device of FIG. 7.

With reference to FIG. 8, the grasping head 202 comprises a body 220, delimiting the chamber 204, and a plurality of strippers 222, each movably mounted in translation on the body 220. The grasping head 202 also comprises a member 224 for connecting the body to the automated arm 206, and actuators 226, for displacing the strippers 222 relatively to the body 220.

The body 220 comprises a frame 230, a lid 232 and a bottom 234, between which is delimited the chamber 204.

The frame 230, the lid 232 and the bottom 234 are each advantageously in high density polyethylene (HDPE). By using this material, a long lifetime of the body 220 is guaranteed, since HDPE is highly resistant in fresh environments, typically with a temperature of less than 8° C., and to the aggressive cleansing products used in the agrifood industry. Further, HDPE is lightweight, notably lighter than stainless steels, which gives the possibility of using for the automated arm 206, a relatively not very powerful automated arm, therefore inexpensive and saving energy.

The frame 230 and the bottom 234 are made together in the same material. The frame 230 and the lid 232 are detachably assembled to each other, so as to allow cleaning of the chamber 204. For this purpose, the lid 232 has a plurality of through-orifices (not shown), distributed at its periphery and positioned facing respective tapped orifices (not shown) made in the frame 230, and screws 236, each engaged through one of the through-orifices and screwed to the respective tapped orifice.

The frame 230 has a substantially parallelepipedal shape.

The lid 232 has a shape mating that of the frame 230. It bears the connecting member 224.

The lid 232 also bears a connector 238 for the first and second fluidic connections 212, 214. The connector 238 has a general Y-shape, with the leg 239A of the Y fluidically connected to the chamber 204, a first branch 239B of the Y fluidically connected to the first fluidic connection 212, and a second branch 239C of the Y fluidically connected to the second fluidic connection 214. The first branch 239B has a greater diameter than that of the second branch 239C.

The bottom 234 has a substantially planar outer face 240, from which protrude a plurality of protrusions 242 (FIG. 9) from the bottom 234. Each protrusion 242 protrudes outwards, opposite to the chamber 204.

The protrusions 242 are aligned in substantially parallel rows 244 with each other and in columns 245 substantially parallel with each other. The columns 245 are substantially oriented perpendicularly to the rows 244. The number of columns 245 is equal to the number of central belts 100 which the driving device 40 comprises.

By <<substantially parallel>>, is meant that the angle formed between two consecutive rows 244 or two consecutive columns 245 is less than 0°7'.

Figure 9:
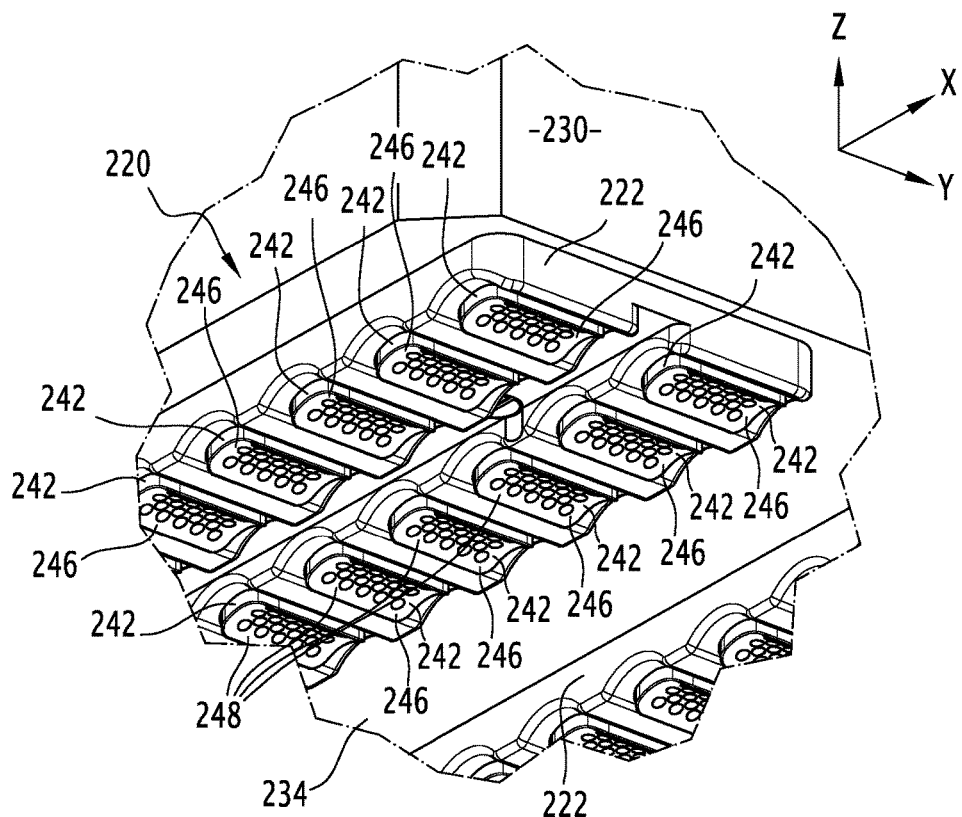
FIG. 9 is a view of a detail of the grasping head, marked as IX in FIG. 8.

With reference to FIG. 9, each protrusion 242 is hollow. It delimits an internal cavity (not shown) opening into the chamber 204. It is closed at its end opposite to the outer face 240 by a perforated plate 246.

Subsequently, the internal cavity of each protrusion 242 will be assimilated to one portion of the chamber 204.

The perforated plate 246 of each protrusion 242 defines an outer surface 248 for receiving one of the stuffed foods 10. This receiving surface 248 is intended to come into contact with a surface 250 (FIG. 1) for grasping said stuffed food 10.

The grasping surface 250 is formed by more than 25% of the outer surface area of the stuffed food 10. In particular it is formed by a portion of the side face 11C.

The grasping surface 250 does not extend from one of the axial ends of the stuffed food 10 to the other end. In other words, end segments 252, 254 (FIG. 1) of the stuffed food 10 are left free on either side of the grasping surface 250.

The receiving surface 248 is concave, with concavity oriented opposite to the chamber 204. In particular, the receiving surface 248 has a shape mating that of the grasping surface 250. Thus, in the illustrated example, the receiving surface 248 has a cylinder portion shape. An axial direction of the receiving surface 248 is defined with reference to the cylinder, for which the receiving surface 248 would thus form a portion.

Figure 10:
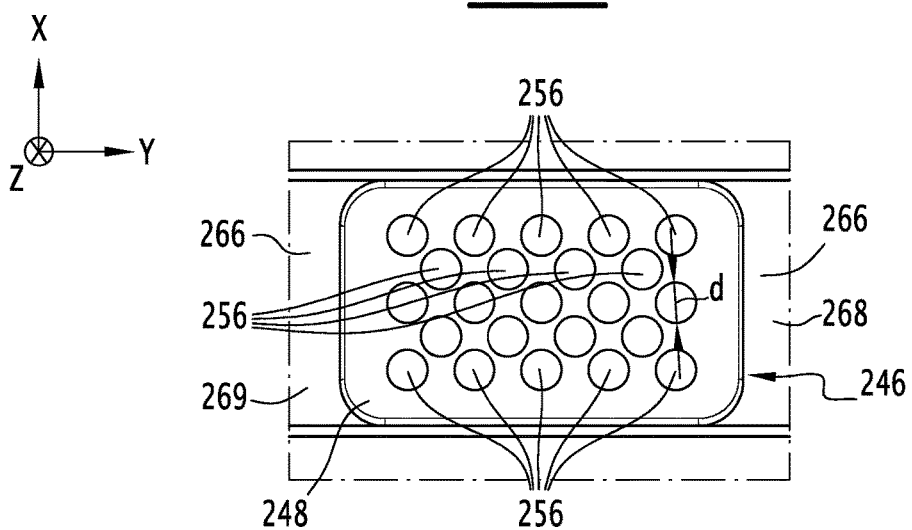
FIG. 10 is a bottom view of a detail of the grasping head of FIG. 8.

With reference to FIG. 10, the perforated plate 246 has a plurality of perforations 256 each opening into the grasping surface 248 and into the chamber 204. Each perforation 256 has a diameter d of less than 2 mm, and preferably comprised between 1.5 and 2 mm.

Figure 11:
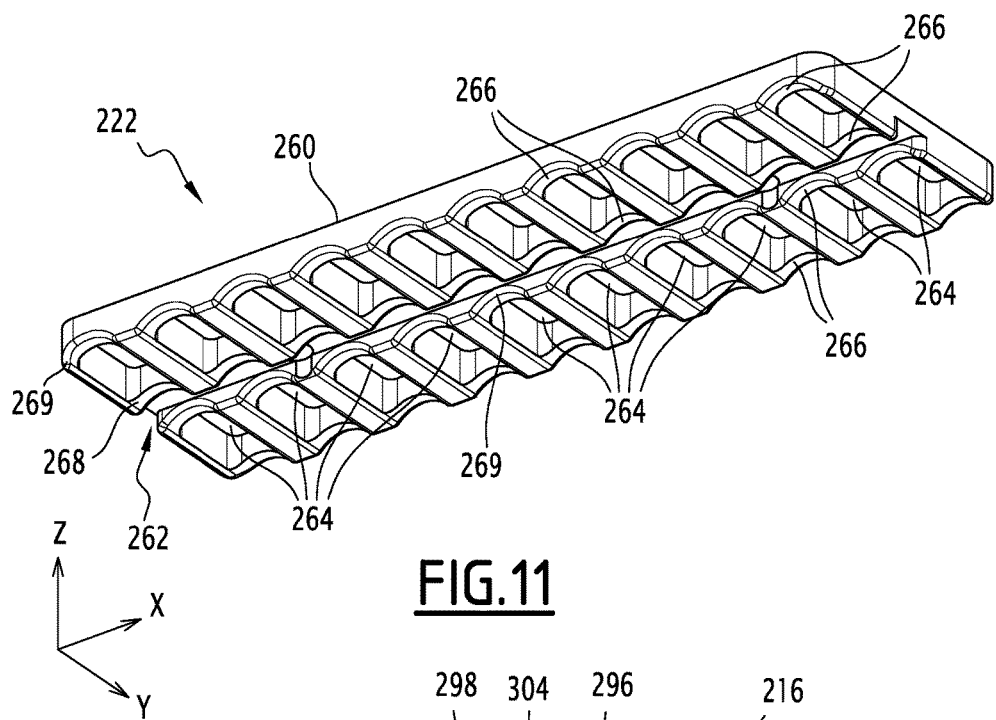
FIG. 11 is a perspective bottom view of a stripper of the grasping head of FIG. 8.

With reference to FIG. 11, each stripper 222 is formed with one piece in HDPE. It has an upper face 260, intended to come into contact with the outer face 240 of the bottom 234, a lower face 262, opposite to the upper face 260, and a plurality of through-windows 264, each opening into the upper face 260 and into the lower face 262.

Each window 264 is associated with a respective protrusion 242. The respective protrusion 242 extends through the window 264, so that the stripper 222 surrounds said protrusion 242. The window 264 has a contour mating the outer contour of the perforated plate 246 closing the respective protrusion 242.

Each stripper 222 is adapted for surrounding the protrusions 242 of two adjacent columns 245.

Each stripper 222 has a plurality of supporting surfaces 266, each surrounding a respective window 264. In particular, each stripper 222 has a supporting surface 266 for each window 264 of the stripper.

Each supporting surface 266 thus also surrounds a respective receiving surface 248, which is the receiving surface 248 defined by the perforated plate 246 closing the protrusion 242 associated with the respective window 264.

Each stripper 222 is movably mounted in translation relatively to the body 220 between a retracted position, in which each supporting surface 266 of the stripper 222 is set back towards the chamber 204 relatively to the receiving surface 248, and a deployed position, in which, for each supporting surface 266, the respective receiving surface 248 is set back towards the chamber 204 relatively to said supporting surface 266.

The supporting surface 266 is intended to come and bear against the end segment 252, 254 of a stuffed food 10 in contact with the respective receiving surface 248, when the stripper 222 is in a deployed position.

For this purpose, the supporting surface 266 comprises two portions 268, 269 positioned on either side of the receiving surface 248. Each of said portions 268, 269 is concave. Each of said portions 268, 269 is positioned at an axial end of the receiving surface 248. A first portion 268 of said portions 268, 269 is thus adapted for bearing against a first 252 of the end segments 252, 254 of the stuffed food 10, and the second portion 269 is adapted for bearing against the second end segment 254 of the stuffed food 10.

In the illustrated example, the supporting surface 266 is formed by said portions 268, 269.

Returning to FIG. 8, in the illustrated example, each actuator 226 is formed by a hydraulic cylinder. It comprises a cylinder 270 secured to the connecting member 224, and a piston 272 secured to each stripper 222.

The automated arm 206 is programmed so as to displace the grasping head 202 between a position for grasping the stuffed foods 10, in which the grasping head 202 is positioned above the central belts 100, close to said central belts 100, and a position for depositing the stuffed foods 10, in which the grasping head 202 is away from the central belts 100, above a tray conveyor (not shown).

In the grasping position, each row 244 is substantially oriented transversely and each column 245 is substantially oriented longitudinally.

Returning to FIG. 7, the depressurization system 208 is typically formed by a vacuum pump, for example an air pump with a venturi effect, or a vacuum pump with a side channel.

The blowing system 210 typically comprises an air compressor.

Each of the first and second fluidic connections, 212, 214 respectively, comprises a single pipe, 274, 276, respectively connected through one end to an outlet 278 of the depressurization system 208, to an outlet 280 of the blowing system 210 respectively, and connected through the opposite end to the connector 238 of the head 202. Thus, the automated arm 206 may displace the head 202 without any risk of entanglement of the first and second fluidic connections 212, 214.

The valve 216 is for example as illustrated, positioned in proximity to the end of the pipe of the first fluidic connection 212 for connection to the depressurization system 208.

Figure 12:
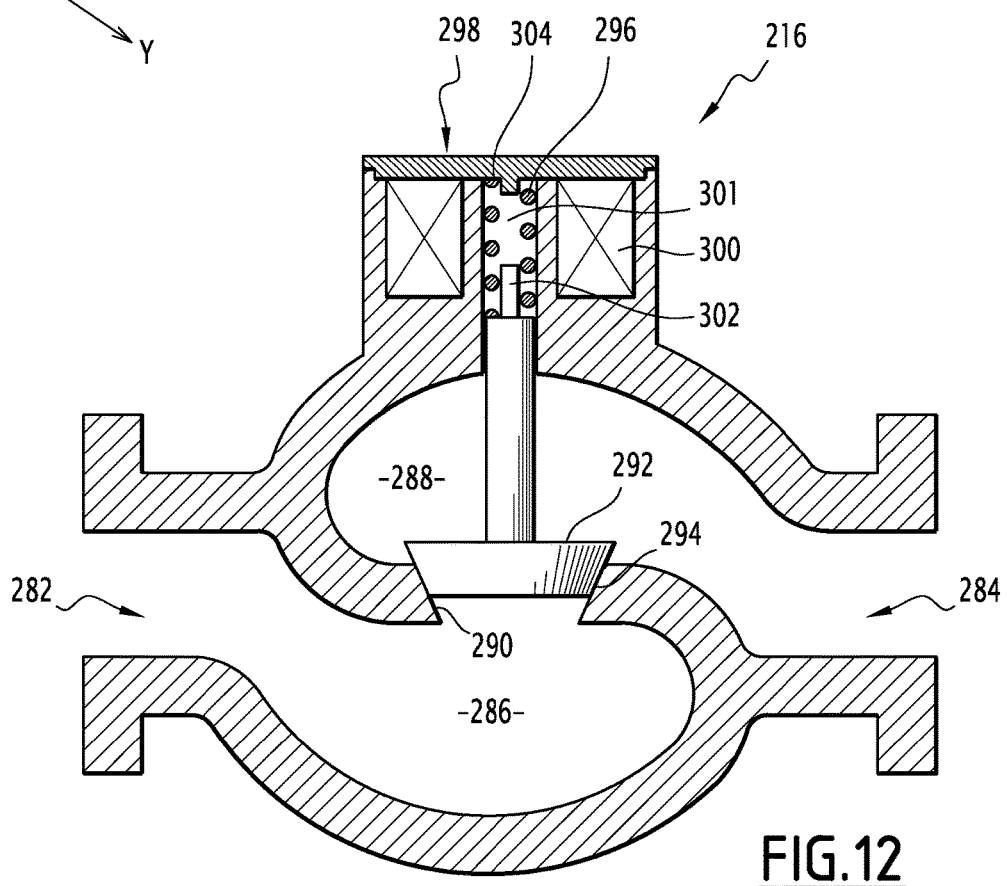
FIG. 12 is a sectional view of a valve of the grasping device of FIG. 6.

With reference to FIG. 12, the valve 216 as illustrated is a check valve. The valve 216 therefore comprises in a known way, an inlet 282, an outlet 284, an upstream chamber 286, fluidically connected to the input 282, a downstream chamber 288, fluidically connected to the outlet 284, an orifice 290 for fluidic connection of the upstream chamber 286 to the downstream chamber 288, and a gate 292 for obturating the orifice 290.

The valve gate 292 is movable between a position for obturating the orifice 290, in which it bears against a sheet 294 surrounding the orifice 290, as illustrated in FIG. 12, and a position (not shown) for freeing the orifice 290, in which the valve gate 292 is away from the sheet 294.

The valve 216 also comprises means 296 for returning the valve gate 292 back to its obturation position, and an electromagnetic actuator 298, for displacing the valve gate 292 towards its release position.

The electromagnetic actuator 298 typically comprises, as illustrated, a coaxial solenoid 300, and a movable soft iron core 302, slidably mounted in a cavity 301 relatively to the solenoid 300. The cavity 301 is oriented along the axis of the solenoid 300. The soft iron core 302 is secured to the check valve 292.

The electromagnetic actuator 298 is adapted so that when a current flows in the solenoid 300, the movable core 302 moves towards a bottom 304 of the cavity 301.

In the illustrated example, the return means 296 are formed by a spring operating in compression and interposed between the movable core 302 on the one hand, and the bottom 304 of the cavity 301 on the other hand.

A method for producing stuffed foods by means of the unit 20 will now be described, with reference to FIGS. 2 to 12.

In a first phase, a block of ham (not shown) is introduced into the supply station 22. It is cut into slices, each slice forming a sheet of food product 24. Each sheet 24 is deposited on the upper surface 60 of the driving belt 30, and is driven by the latter downstream.

In a second phase, the worm screw 55L turns by a predetermined number of turns around its axis. By doing this, it pushes the second food product present in the tube 55B towards the flexible hose 50.

The metering device 53 thus injects a predetermined amount of second food product into the flexible hose 50. Under the effect of the pressure caused by this injection of a second food product, the second food product present in the flexible hose 50 exits through the proximal end 54. Simultaneously, the arm 51 displaces the proximal end 54 of the flexible hose 50 from right to left, downstream from a sheet of first food product 24. Thus, the second food product is deposited on the driving belt 30 as a roller 28 positioned downstream from said sheet 24.

Driven by the belt 30, the roller 28 and the sheet 24 penetrate into the winding station 32. Therein, they are introduced between the driving belt 30 and the second belt 72.

First of all, an upper surface of the roller 28 comes into contact with the second belt 72. The second belt 72 retains this upper surface while the lower contact face of the roller 28 with the belt 30 continues to be driven downstream. Under the effect of these opposing forces, the roller 28 begins to roll on the driving belt 30 and on the second belt 72. By rolling over the driving belt 30, the roller 28 comes into contact with the sheet 24, and rolls on the sheet 24. The sheet 24 adheres to the roller 28 and under the effect of the rotation of the roller 28 around its axis, is wound around the roller 28.

When the sheet 24 is entirely wound around the roller 28, both form together a large roll 34. The large roll 34 continues to roll on itself under the combined effect of the driving belt 30 and of the second belt 72, until it attains the downstream end 78 of the second belt 72. Thus, the cohesion of the large roll 34 is reinforced.

When the large roll 34 passes under a tube 84, this tube is lifted up and rolls on the belt 72. This rolling movement of the tube 84 allows suitable crushing of the sheet 24 on the roller 28. Thus the outer aspect of the large roll 34 is improved.

The large roll 34 is then driven as far as the downstream end 58 of the belt 30, from where it falls on the storage belt 36. It is then driven by the storage belt 36 as far as its downstream end 89, from where it falls into the cells 116 of the belts 100, 101.

The large roll 34 is conveyed by the belts 100, 101 through the cutting station 38, where it is cut into segments 39 by cutting with a water jet. Each segment 39 is therefore borne by a respective belt 100, 101. The segments 39 corresponding to the transverse ends of the large roll 34 form scraps 119 and are borne by the end belts 101. The other segment 39 form stuffed foods 10 and are borne by the central belts 100.

Each scrap 119, borne by an end belt 101, falls down to the level of the terminal end 118 of each belt 101. In the case when said scrap 119, instead of falling remains stuck to the adjacent stuffed food 10, the scrap 119 is detached by means of one of the air knives 120, 122. For this purpose, when the scrap 119 is below the air knife 120, 122, the solenoid valve 130 opens in order to fluidically connect the pipe 128 to the chamber of the body 124. Compressed air penetrates into said chamber and flows out under pressure through the oblong orifice 126. This compressed air pushes the scrap 119 downwards, which is then detached from the stuffed food 10 and falls.

The stuffed foods 10 then continue to be driven towards the downstream side by the belts 100. The belts 100 diverge relatively to each other, the stuffed foods 10 are gradually moved away from each other. Finally they arrive in the packing station 44, where they are grasped on the belts 100 by the grasping device 200.

In particular, the automated arm 206 brings the head 202 into the grasping position, so that the receiving surface 248 defined by the perforated plate 246 closing each protrusion 242 from the bottom 234 is in contact with a stuffed food 10. Therein, a current is injected into the solenoid 300 of the electromagnetic actuator 298 of the valve 216 and the valve gate 292 is displaced into the position for clearing the orifice 290. The depressurization system 208 then sucks up the air present in the chamber 204.

As the perforations 256 of each perforated plate 246 are clogged by a stuffed food 10, air may not enter the chamber 204 for compensating for the air sucked out by the depressurization system 208. A relative vacuum is therefore generated in the chamber 204 and, under the effect of this vacuum, the stuffed foods 10 are flattened against the receiving surfaces 248. By the shape of these receiving surfaces 248, and by the small diameter of the perforations 256, the stuffed foods 10 are not deformed.

The automated arm 206 then displaces the head 202 into the deposition position. During the whole duration of this displacement, the solenoid 300 continues to be supplied with electric current, and the depressurization system 208 is kept operating.

Once the head 202 is in the deposition position, the solenoid 300 stops being supplied with electric current. Under the effect of the return means 296, the valve gate 292 is suddenly displaced into a position for obturating the orifice 290, which gives the possibility of instantaneously stopping the depressurization of the chamber 204, which rapidly returns to pressure equilibrium with the outside.

The stuffed foods 10 are then no longer flattened against the receiving surfaces 248, and may fall into trays positioned underneath the head 202.

Nevertheless, as the stuffed foods 10 are sticky, they tend to remain stuck to the receiving surfaces 248. In order to facilitate their detachment, air is therefore blown into the chamber 204 by means of the blowing system 210. Under the effect of the blown air, the pressure increases in the chamber 204, and the pressurized air is expelled through the perforations 256. This pressurized air pushes on the stuffed foods 10 and thus contributes to detaching them from their respective receiving surfaces 248.

In order to assist with detachment, each stripper 222 is at the same time displaced from its retracted position to its deployed position. Thus, each supporting surface 266 bears upon the end segments 252, 254 of a stuffed food 10, and pushes it away from the receiving surface 248.

This displacement operation of each stripper 222 from its retracted position to its deployed position is repeated at least three times within two segments, each stripper 222 being in the meantime repositioned in the retracted position. It was observed that by repeating the displacement operation, it was possible to obtain better detachment of the stuffed foods 10 and less deform the stuffed foods 10.

The blowing system 210 is then stopped, and the head 202 brought back to the position for grasping the stuffed foods 10.

By means of the invention, it is possible to produce, with great throughput, stuffed foods having a satisfactory aspect, even though these stuffed foods consist of soft and/or sticky products. Further, the invention allows production of these stuffed foods under excellent hygienic conditions, notably by the fact that the cleaning of the production unit is facilitated.

Moreover, the invention allows a deformable product to be grasped by means of a grasping device without deforming the deformable product. Further, the invention gives the possibility of avoiding that the deformable product remains stuck to the grasping device. Further, the cleaning of the grasping device is facilitated, which allows its use in environments having strict hygiene standards, such as units for producing food products. Finally, the invention allows fast handling of deformable products, and is therefore perfectly adapted for use in an industrial unit with high production throughput.

The invention claimed is:

1. A production unit for producing stuffed food(s), each stuffed food comprising an outer envelope of a first food product, and an inner stuffing of a second food product, wherein the production unit comprises:
    a first food product provider for providing the sheet of the first food product,
    a second food product provider for providing the roller of the second food product, and
    a winding station for winding the sheet around the roller, wherein the second food product provider is able to provide the roller so that the roller extends along an axis, and the winding station comprises a first belt and a second belt defining between them a space for introducing the sheet and the roller, the first and second belts having a relative movement with respect to each other with a velocity having a component oriented perpendicularly to the axis of the roller, the first belt being a lower driving belt and the second belt being an upper rolling belt, which is flexible and suspended above the first belt to a suspension device which comprises:
   a tie to which is attached an upstream end of the second belt, and
   a plurality of tubes, each freely mounted on a bar with a diameter less than the inner diameter of the tube, so that each tube is lifted up and rolls on the second belt when the roller and the sheet wound around the roller pass under said tube.

2. The production unit according to claim 1, comprising a cutter for cutting the roller and the sheet wound around the roller into a plurality of segments, each segment forming a stuffed food.

3. The production unit according to claim 2, wherein the cutter is a water jet cutter.

4. The production unit according to claim 2, comprising a plurality of driving belts each specific to a stuffed food, the driving belts diverging from each other.

5. A method for producing stuffed food(s), each stuffed food comprising an outer envelope of a first food product, and an inner stuffing of a second food product, wherein the method comprises the following steps:
   providing a sheet of the first food product, and a roller of the second food product, and
   winding the sheet around the roller,
   wherein the roller extends along an axis and, during the winding step, the sheet of the first food product and the roller of the second food product are introduced between a first belt and a second belt, the first and second belts having a relative movement with respect to each other with a velocity having a component oriented perpendicularly to the axis of the roll, the first belt being a lower driving belt and the second belt being an upper rolling belt, which is flexible and suspended above the first belt, the second belt being suspended to a suspension device, said suspension device comprising:
   a tie to which is attached an upstream end of the second belt, and
   a plurality of tubes, each freely mounted on a bar with a diameter less than the inner diameter of the tube, so that each tube is lifted up and rolls on the second belt when the roller and the sheet wound around the roller pass under said tube.

6. The production method according to claim 5, wherein the first food product is meat.

7. The production method according to claim 5, wherein the first food product is ham.

8. The production method according to claim 5, wherein the second food product consists of soft cheese.

9. The production method according to claim 5, wherein the second food product comprises cheese.

10. The production method according to claim 5, wherein a portion of the second belt is in contact with the first belt.

11. The production method according to claim 5, further comprising a step of cutting the roller and the sheet wound around it into segments, at least one of the segments forming a stuffed food.

12. The production method according to claim 11, wherein the cutting step is ensured by a water jet.

13. The production method according to claim 11, further comprising the step of:
   driving the stuffed foods with respective driving belts, which move away from each other.

* * * * *